US010433002B1

(12) United States Patent
Kuplevakhsky

(10) Patent No.: US 10,433,002 B1
(45) Date of Patent: Oct. 1, 2019

(54) SIMULTANEOUSLY VIEWING MULTIPLE CAMERA ANGLES

(71) Applicant: Dish Ukraine L.L.C., Kharkov (UA)

(72) Inventor: Andrey Kuplevakhsky, Kharkov (UA)

(73) Assignee: DISH Ukraine L.L.C., Kharkov (UA)

( * ) Notice: Subject to any disclaimer, the term of this patent is extended or adjusted under 35 U.S.C. 154(b) by 0 days.

(21) Appl. No.: 16/133,720

(22) Filed: Sep. 18, 2018

Related U.S. Application Data

(63) Continuation of application No. 15/538,438, filed as application No. PCT/UA2014/000137 on Dec. 25, 2014, now Pat. No. 10,110,946.

(51) Int. Cl.
*H04N 21/43* (2011.01)
*H04N 21/462* (2011.01)
*H04N 21/8547* (2011.01)
*H04N 21/218* (2011.01)

(52) U.S. Cl.
CPC ... *H04N 21/4307* (2013.01); *H04N 21/21805* (2013.01); *H04N 21/4622* (2013.01); *H04N 21/8547* (2013.01)

(58) Field of Classification Search
CPC ........ H04N 21/4307; H04N 21/21805; H04N 21/4622; H04N 21/8547; H04N 7/025; H04N 7/173; H04N 5/445
USPC ....... 348/515, 564, 565, 521, 500, 516, 513, 348/706, 711, 718, 719, 723, 725, 739, 348/785; 715/203
See application file for complete search history.

(56) References Cited

U.S. PATENT DOCUMENTS

| | | | | |
|---|---|---|---|---|
| 7,589,760 | B2* | 9/2009 | Zhang | H04N 7/181 348/211.12 |
| 2003/0135822 | A1* | 7/2003 | Evans | H04N 21/2368 715/203 |
| 2013/0235270 | A1* | 9/2013 | Sasaki | H04N 21/4622 348/564 |
| 2014/0195675 | A1* | 7/2014 | Silver | H04L 65/1083 709/224 |
| 2014/0355947 | A1* | 12/2014 | Slamecka | H04N 5/91 386/201 |
| 2014/0355951 | A1* | 12/2014 | Tabak | G11B 27/10 386/241 |
| 2015/0281769 | A1* | 10/2015 | Chiu | H04N 5/38 348/564 |
| 2016/0234542 | A1* | 8/2016 | Stokking | H04N 21/4307 |
| 2017/0324922 | A1* | 11/2017 | Lasser | H04L 65/4076 |

OTHER PUBLICATIONS

Office Action for EP 14 854 903 dated May 7, 2019, all pages.

* cited by examiner

*Primary Examiner* — Jefferey F Harold
*Assistant Examiner* — Mustafizur Rahman
(74) *Attorney, Agent, or Firm* — Kilpatrick Townsend & Stockton LLP

(57) ABSTRACT

Various devices, systems, products and methods for synchronizing video displayed on multiple display devices are presented. The systems, methods, devices and products described herein optionally utilize one or more techniques for synchronizing two or more displays of video of an event filmed from two or more cameras. Synchronization signals are optionally used to allow the video displays to be matched precisely to account for differences in display time, transmission time, delivery time and processing time.

20 Claims, 11 Drawing Sheets

US 10,433,002 B1

SIMULTANEOUSLY VIEWING MULTIPLE CAMERA ANGLES

CROSS-REFERENCE TO RELATED APPLICATIONS

This application is a continuation application of, and claims priority to, co-pending U.S. application Ser. No. 15/538,438, filed on Jun. 21, 2017, entitled "SIMULTANEOUSLY VIEWING MULTIPLE CAMERA ANGLES", which is a U.S. National Stage of PCT International Application No. PCT/UA2014/000137, filed on Dec. 25, 2014, entitled "Simultaneously Viewing Multiple Camera Angles," which is hereby incorporated by reference in its entirety.

BACKGROUND

Many live events shown on broadcast television, such as sporting events, use multiple cameras to simultaneously film parts of the event from multiple vantage points. For example, during a professional football game, various cameras film not only the main activity of the ball and nearby players, but also players anticipated to receive the ball, coaches, players on the sidelines, fans, etc. This allows a broadcast of the football game to switch between the various camera angles to focus on specific activity on and off the field as it occurs. Additionally, various camera angles aid in officiating the game, by allowing the referees to review a play from multiple angles to allow for determination of, for example, where exactly a player's feet hit the ground and whether the player was in or out of bounds.

During a live broadcast of a sporting event, camera views are switched dynamically, with the director, producer or other production staff directing which camera angles to highlight and when. Such a broadcast is seamless to the viewer, who simply observes the resultant video broadcast with the camera angles switching to focus on various aspects of the field. Audio of the event is typically overlaid with commentary provided in real time by one or more announcers, with both the audio and video portions synchronized to match the real-time broadcast.

In video production, a clapperboard is used to synchronize video with separately recorded audio. During post-production, the clap noise made by the clapperboard and the visual closing of the clapstick can be aligned in time so that the audio and the video synchronize. Enhancing audio and video special effects can also be added during post-production and the precise alignment of audio and video effects is crucial to a good viewing experience. This technique is of little value in synchronizing broadcast video of live events, however, due at least in part from the need to transmit the video in real-time

SUMMARY

In various aspects, provided are systems, methods and devices, such as television receivers, display devices, and displays, for providing synchronized video of multiple camera angles of a video broadcast displayed on multiple displays. In a related aspect, computer-program products are provided, such as a product tangibly embodied on a non-transitory machine-readable medium with instructions configured to cause a computing device or processor to perform any of the methods described herein. The systems, methods, devices and products described herein optionally utilize one or more techniques for synchronizing two or more displays of video of an event filmed from two or more cameras. Synchronization signals are optionally used to allow the video displays to be matched precisely to account for differences in display time, transmission time, delivery time and processing time.

In embodiments, the methods, systems, products and devices described herein allow for displaying video of an event, taken from multiple cameras at different vantage points to be displayed on multiple devices simultaneously such that the displays are synchronized. For example, video of a sporting event from the main broadcast can be displayed on a first display device, such as a television, and secondary video of the sporting event taken from a different camera, such as on an opposite side of a play field or taken from a different perspective, can be displayed on a second display device, for example a tablet or smartphone, with the video shown on both displays being synchronized such that events that occur in both videos at the same time appear on a respective display at the same time.

In one aspect, provided are methods for real-time synchronization of video of an event from multiple cameras. In an exemplary embodiment, a method of this aspect comprises receiving a first video stream corresponding to video of the event from a first camera angle; receiving a second video stream corresponding to video of the event from a second camera angle; transmitting the first video stream to the first display device; receiving a request to display the second video stream on a second display device; transmitting the second video stream to the second display device; and adjusting displays of at least one of the first video stream and the second video stream in real-time to synchronize displays of the first video stream and the second video stream. Optionally, the first video stream and the second video stream are each independently received via antenna, satellite, cable or data network.

In various embodiments, the first video stream and/or the second video stream include a synchronization signal. For example, in some methods a display devices monitor a display of a video stream to detect a synchronization signal in order to synchronize the display of video. Optionally, a display device includes specialized hardware for generating or monitoring synchronization signals, such as optical, audio or other hardware. Optionally, a television receiver includes specialized hardware for generating or monitoring synchronization signals, such as optical, audio or other hardware.

Optionally, the first video stream is transmitted wirelessly to the first display device. Optionally, the second video stream is transmitted wirelessly to the second display device. Optionally, the first video stream is transmitted, at least in part, to the first display device over a network connection, such as a TCP/IP network. Optionally, the second video stream is transmitted, at least in part, to the second display device over a network connection, such as a TCP/IP network. When video is transmitted wirelessly or over a TCP/IP network, depending on the method of transmission, the video may need to be buffered in order to allow for a good viewing experience by the viewer. Buffering is useful for situations where a video data rate is larger than an available transmission bandwidth or where the transmission bandwidth can change as a function of time. For typical situations where a tablet computer or smartphone is one of the display devices, the transmission to the tablet computer or smartphone will be over a wireless network connection.

In various embodiments, adjusting displays of at least one of the first video stream and the second video stream is beneficial for providing a good viewing experience to the user. For example, by adjusting the displays of the video streams, the synchronicity of the video can be aligned. Various techniques are useful for adjusting the displays to synchronize the display of the video streams. For example, in one embodiment, adjusting displays of at least one of the first video stream and the second video stream includes identifying a first timestamp in the first video stream; identifying a second timestamp in the second video stream; determining a time difference between the first timestamp and the second timestamp; and changing a timing of transmitting or displaying at least one of the first video stream and the second video stream to accommodate the time difference. In another embodiment, adjusting displays of at least one of the first video stream and the second video stream includes monitoring a display of the first video stream; and beginning displaying the second video stream upon detecting a synchronization signal in the first video stream.

Optionally, adjusting displays of at least one of the first video stream and the second video stream includes identifying a delay associated with displaying at least one of the first video stream and the second video stream; and changing a timing of transmitting or displaying at least one of the first video stream and the second video stream to accommodate the delay. As used herein, changing a timing of transmitting a video stream includes transmitting the video stream at a faster frame rate, at a slower frame rate, by adding additional video frames or by skipping one or more video frames. In some embodiments, changing a timing of transmitting a video stream includes delaying a video stream transmission. Optionally, adjusting displays of at least one of the first video stream and the second video stream includes delaying a transmission or display of a first portion of the first video stream or a second portion of the second video stream skipping displaying or transmitting the first portion of the first video stream or the second portion of the second video stream; or changing a frame rate of the first portion of the first video stream or the second portion of the second video stream.

As will be understood by the skilled artisan, aspects of the methods, systems, devices and products of the invention are useful with a digital video recorder (DVR), which can record broadcast video for later playback. In some embodiments, methods of this aspect are useful for re-synchronizing video displayed on two different displays when a user decides to rewind or fast forward video displayed on one or both of the displays. For example, a user may wish to re-view video displayed on one display, while the video on another display is allowed to continue playing. Such a situation may occur, for example, where an interesting play at a sporting event occurs and the user wishes to watch the play again, but only from a single perspective. Upon receiving a signal at a receiver or system associated with the display device to re-synchronize the video, the video displayed on the display that was played an additional time can be skipped back ahead to match the timing of the other display. Alternatively, the other display can be delayed or paused while the re-viewed video catches up to the play time of the delayed/paused video. Other combinations, including fast forwarding and rewinding of the video streams, are contemplated and included in the present disclosure.

In another aspect, provided are devices and systems, such as receivers, set top boxes, and/or display devices, such as a television. In one embodiment, a receiver of this aspect comprises one or more processors; and a memory communicatively coupled with and readable by the one or more processors and having stored therein processor-readable instructions. In various embodiments, receivers of this aspect optionally further comprise one or more receiver circuits for receiving at least one of a first video stream and a second video stream, one or more data output connections for transmitting at least one of the first video stream and the second video stream, for example to a first or second display device. For example, useful data output connections including but are not limited to audio/video output connections. USB data connections, Firewire data connections, and the like. Optionally, the processor-readable instructions, when executed by the one or more processors cause the one or more processors to perform any of the methods described herein. For example, in one embodiment, the processor readable instructions, when executed by the one or more processors, cause the one or more processors to receive a first video stream corresponding to video of the event from a first camera angle; receive a second video stream corresponding to video of the event from a second camera angle; transmit the first video stream to the first display device; receiving a request to display the second video stream on a second display device; transmit the second video stream to the second display device; adjust displays of at least one of the first video stream and the second video stream in real-time to synchronize displays of the first video stream and the second video stream.

In another aspect, provided are computer program products, such as non-transitory processor-readable media for real-time synchronization of video of an event from multiple camera angles. In one embodiment, a processor readable medium of this aspect comprises processor-readable instructions. Optionally, the processor-readable instructions, when executed by one or more processors cause the one or more processors to perform any of the methods described herein. For example, in one embodiment, the processor readable instructions, when executed by one or more processors, cause the one or more processors to receive a first video stream corresponding to video of the event from a first camera angle; receive a second video stream corresponding to video of the event from a second camera angle; transmit the first video stream to the first display device; receiving a request to display the second video stream on a second display device; transmit the second video stream to the second display device; adjust displays of at least one of the first video stream and the second video stream in real-time to synchronize displays of the first video stream and the second video stream.

In another aspect, the invention is embodied as a mobile device or a computer program product for a mobile device, such as a tablet or smartphone, or a method for displaying video on a mobile device. In various embodiments, a mobile device related to this aspect is used as a display device for displaying a video stream, such as a second video stream, which is synchronized with the display of a first video stream on another display device. Optionally, methods related to this aspect monitor the first video stream displayed on another device using a capture device of the mobile device, such as a microphone or a digital imaging camera.

Optionally, methods related to this aspect receive data from a receiver or a display that is associated with a display of the first video stream, such as signals indicating a timestamp, a watermark or other information related to the display of the first video stream. For example, data is optionally communicated, at least in part, to the mobile device wirelessly, such as using one or more wireless technologies, including, but not limited to, Bluetooth, Wi-Fi, near field communication (NFC), cellular radio technology, wireless Universal Serial Bus (USB), Z-Wave, ZigBee, IrDA and the like. Such data is optionally communicated, at least in part, over a wired connection, such as USB, Ethernet, FireWire, serial communication, etc. Synchronization signals can be communicated between the mobile device and another display device or an associated receiver such that the displays of the two video streams are synchronized.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Various factors can affect whether two video streams are displayed in synch. For example, a slight offset in display rendering times of two displays can impact what would be otherwise perfect synchronicity. Processing the video for display may also result in a delay of displayed video. Depending on the video delivery method, a video stream may be delayed, slowed or otherwise stalled, which can also impact whether synchronized displays are even possible. For example, for video delivered over a data network, such as the internet, network congestion, video bitrate and available bandwidth can change the need to buffer video before it is displayed.

To compensate for these and other issues which impact synchronicity of video displays, embodied methods, devices, systems and products of the invention implement techniques that allow for delays in video displays to be accommodated to enable synchronized video of different camera angles to be presented on two different displays.

Although the embodiments described herein may frequently be described with reference to a live video broadcast, the disclosed methods, systems, devices and products are applicable to recorded video, such as video recorded by a digital video recorder (DVR). For example, the video displayed by one or more display devices is optionally recorded video. In some embodiments, the videos captured by cameras at various camera angles are optionally provided as separate broadcasts, such as on different channels/frequencies or different digital subchannels. For example, in one embodiment a first video stream from a first camera angle is provided on a first channel or subchannel and a second video stream from a second camera angle is provided on a second channel or subchannel. Using the techniques described herein, synchronicity of the two video streams displayed on two different display devices can be achieved.

Further, although embodiments described herein may be described with reference to two video streams having displays synchronized on two display devices, the skilled artisan will understand that the devices, methods, systems and products of the invention are applicable to the synchronization of any number of displays of video streams across any number of display devices. For example, embodiments are contemplated where three video streams are displayed in synchronicity on three display devices, or where ten video streams are displayed in synchronicity on ten display devices.

Additionally, depending upon the specific video streams, portions of the video streams may be identical, in part, such that the same exact video, taken from a single camera, may be displayed simultaneously on multiple displays. This configuration would typically result from the choice of a director, producer or other production staff to show video from the same camera on two separate video streams for a short period of time when, otherwise, the two video streams include video from two different camera angles.

Figure 1A:
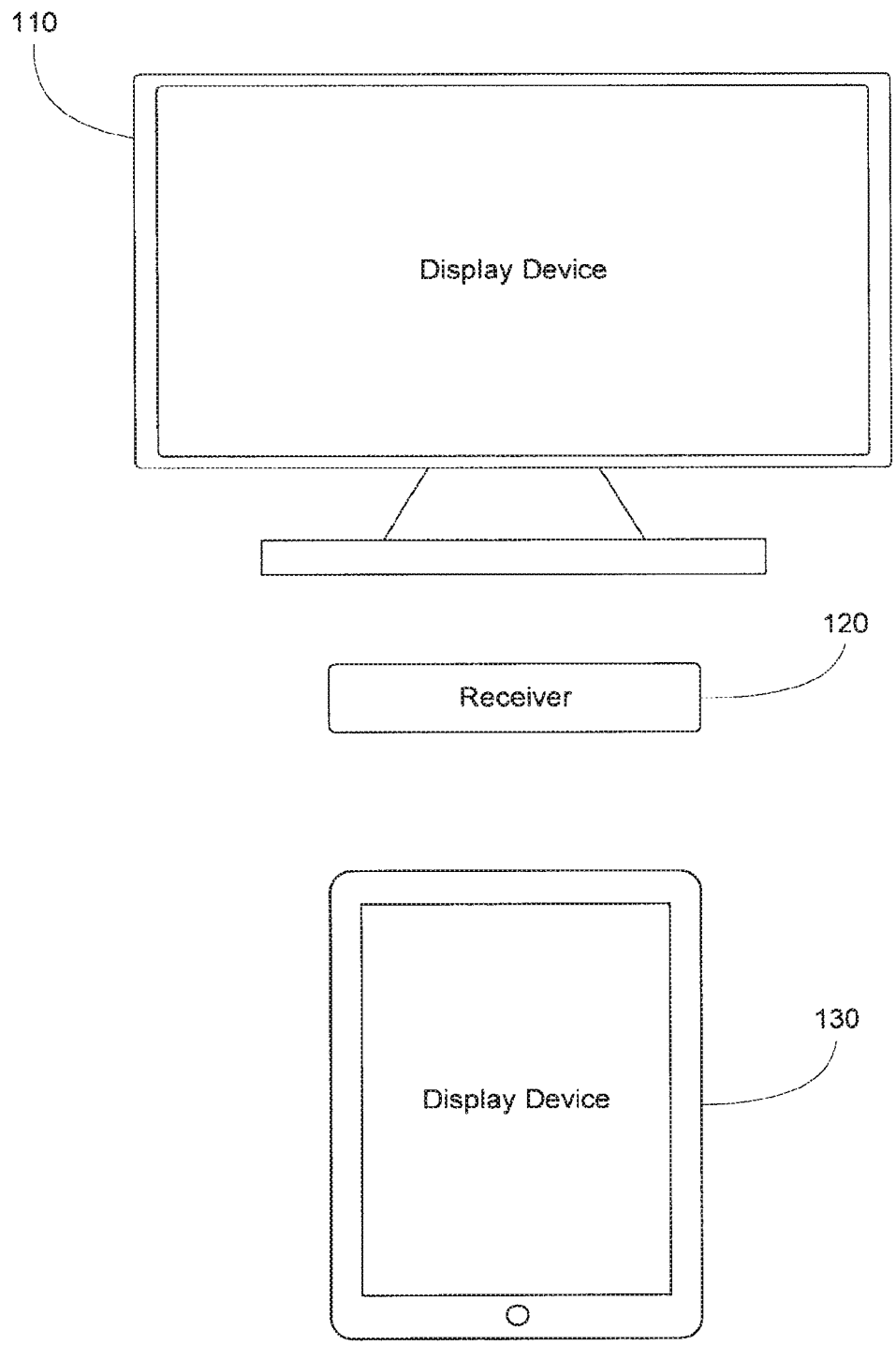
FIG. 1A illustrates system embodiment with two display devices.

FIG. 1A provides an illustration showing two different displays. In FIG. 1A, a display device 110, such as a television, is connected to a receiver 120, such as a set-top box receiver as may be commonly used with digital cable systems, digital satellite systems, IPTV systems, and digital television adapters. In various embodiments, however, receiver circuitry may be directly implemented in display device 110, such as a digital broadcast tuner, digital cable tuner, digital satellite receiver or IPTV receiver in which case receiver 120 is then incorporated into display device 110.

Receiver 120 is optionally connected to display device 110 using a wired analog or digital connection, such as by way of a coaxial or HDMI cable. In some embodiments, display device 110 connects to receiver 120 wirelessly, such as via WiDi, WirelessHD or another wireless display technique. In some embodiments, receiver 120 may be a small adapter that connects directly to a video input port on display device 110, draws power from the video input port or another power source, such as a USB power source, and receives video using one or more wireless protocols, including the 802.11 family of wireless technologies.

In FIG. 1A, a second display device 130 is also illustrated. Display device 130 is illustrated as a tablet computer, such as an Apple iOS based tablet, an Android based tablet, a Microsoft Windows based tablet and the like. In other embodiments, display device 130 is a laptop computer, smartphone, television, monitor, etc. Display device 130 is optionally provided with a touchscreen interface to allow a user to provide input using a fingertip or stylus, Display device 130 receives video, such as directly from receiver 120 or from a data network connected to receiver 120, and displays the received video.

Figure 1B:
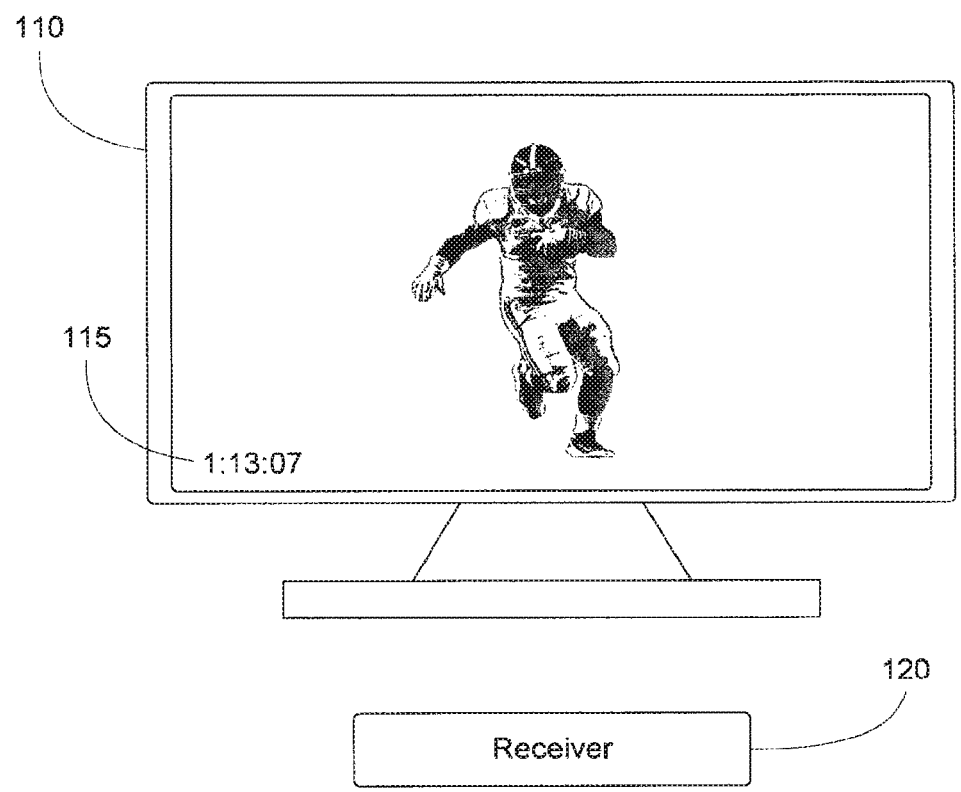
FIG. 1B illustrates system embodiment with two unsynchronized display devices.
Figure 1B:
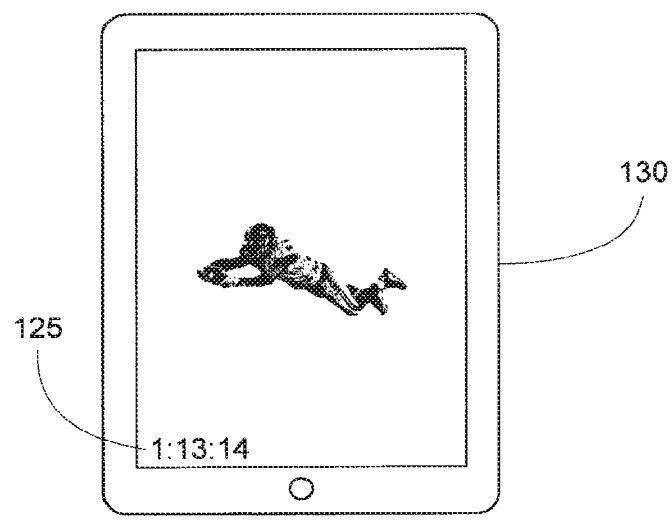

FIG. 1B illustrates an embodiment where a sporting event is displayed on display device 110 and on display device 120. As illustrated, time stamps 115 and 125 are embedded in the video displayed on display devices 110 and 130. Although, in the embodiment shown in FIG. 1B, the timestamps 115 and 125 are displayed on-screen, in other embodiments timestamps 115 and 125 are not displayed on-screen but are still included in the video being displayed. Optionally, a time difference between timestamps 115 and 125 of video being displayed on display devices 110 and 130 is determined and the timing of the display of the video on display device 110 and/or 130 is adjusted. For example, as illustrated in FIG. 1B, display device 110 shows a time stamp of 1:13:07 and display device 130 shows a time stamp of 1:13:14 for a time difference of 7 seconds. In one embodiment, the display of the video on display device 110 is accelerated, such as by skipping about 7 seconds of video such that the two displays become synchronized. In another embodiment, the display, of the video on display device 110 is delayed, such as by waiting about 7 seconds in order that the two displays become synchronized. In another embodiment, the display of the video on display device 130 is returned by about 7 seconds in order that the two displays become synchronized. Other embodiments are contemplated where the further ahead video is delayed or replayed while the further behind video is accelerated.

Figure 1C:
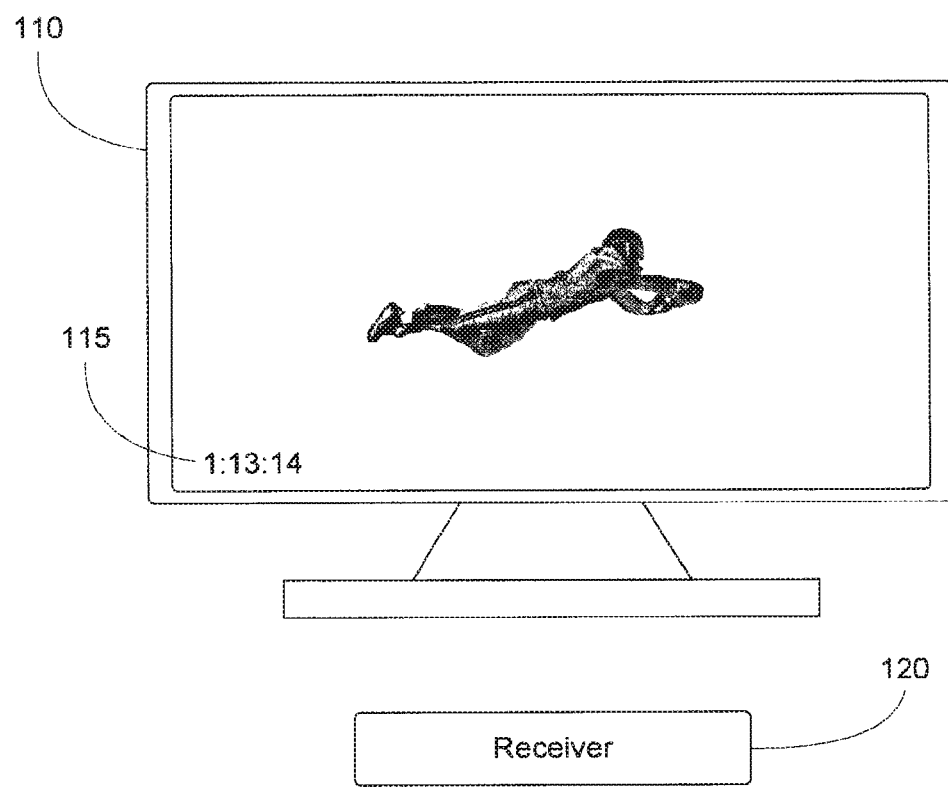
FIG. 1C illustrates system embodiment with two display devices showing synchronized displays of the same event from two different camera angles.
Figure 1C:
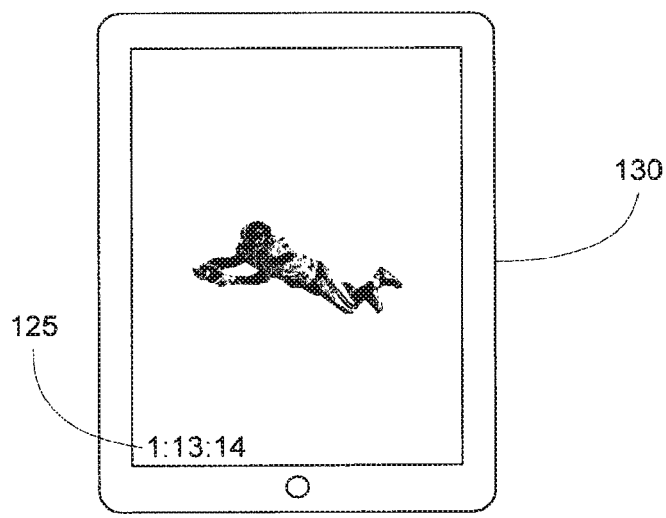

In FIG. 1C, the video displayed on display device 110 is synchronized with the video displayed on display device 130. As illustrated, the two videos are of the same event but displayed from two different camera angles in a synchronous fashion with timestamps 115 and 125 showing 1:13:14. Although aspects of the invention are described with reference to sporting event video streams, embodiments are contemplated and included where the video streams are any format or genre of video, such as television programs, films, documentaries, news, etc., that include multiple camera views to be displayed synchronously.

Figure 2A:
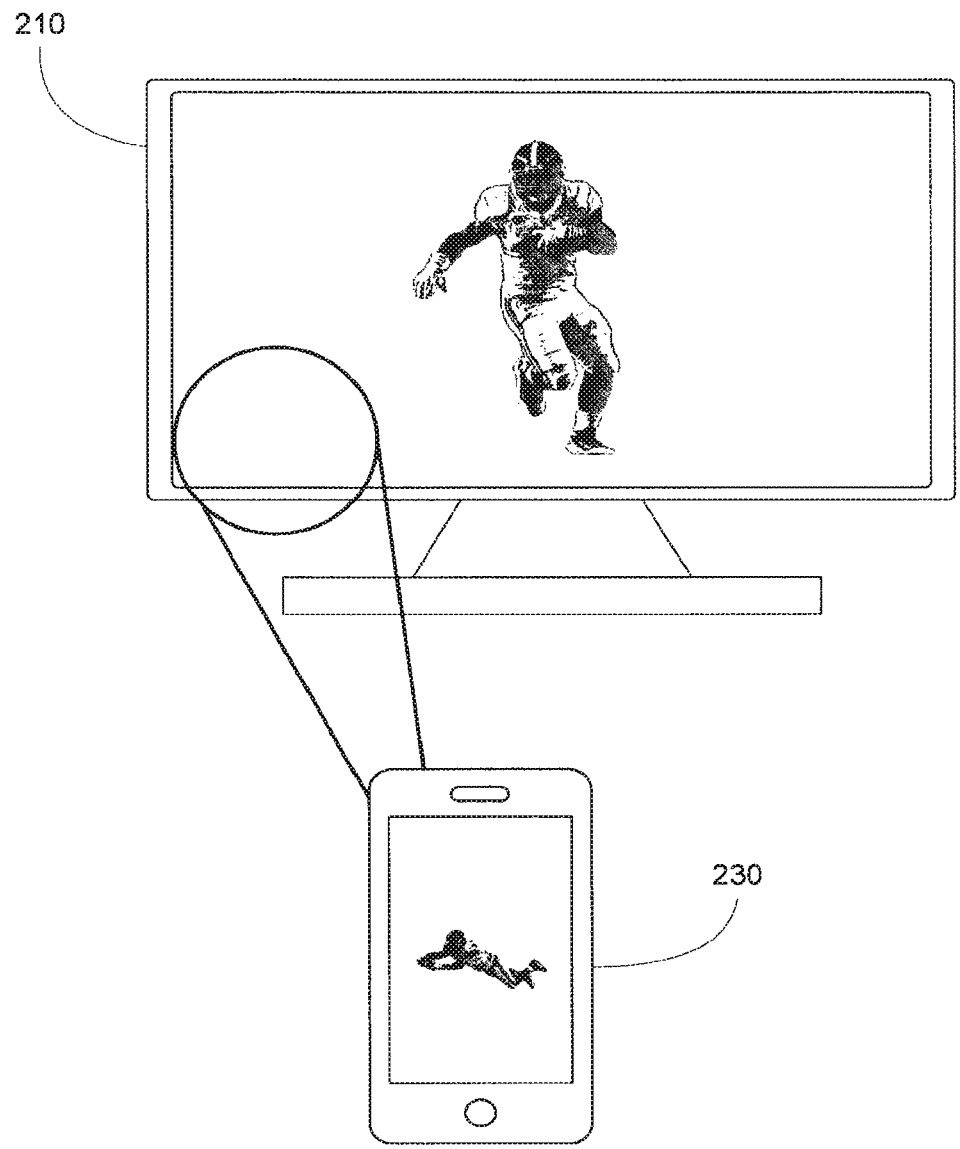
FIG. 2A illustrates an embodiment of monitoring a video broadcast for a synchronization signal.

Various other techniques can be used to synchronize the display of videos on different display devices. For example, an embodiment is shown in FIG. 2A where a display device 230 monitors at least a portion of the video displayed by display device 210 for a synchronize signal.

As described herein, a synchronize signal refers to a detectable signal included with a video stream that is used to synchronize the display of two video streams. In some embodiments, a synchronize signal is included as an audible signal in an audio portion of a video stream. Optionally, the synchronize signal included as an audible signal is a sequence or series of pops, beeps, etc. that are detectable by a display device, receiver, system or product of an embodiment of the invention but may be imperceptible or subtle to the human ear, so as not to interrupt or degrade from the video viewing experience. In some embodiments a synchronize signal is included as a viewable signal in a video portion of a video stream. In some embodiments, a synchronize signal is a watermark included in audio or video portions of a video stream. Optionally, the synchronize signal included as an audible signal is a sequence or series of images or patterns that are detectable by a display device, receiver, system or product of an embodiment of the invention but may be imperceptible or subtle to the human ear, so as not to interrupt or degrade from the video viewing experience.

For example, in one embodiment the synchronize signal is included at an edge of a video or image displayed on a display device. In another embodiment, the synchronize signal is one or more video frames of a single color (e.g., white) or video frames that include images or patterns, such as a barcode. Other embodiments are contemplated, such as where the synchronize signal is a radio frequency or optical signal and hardware is included in a display device or receiver for generating and/or detecting the radio frequency or optical signal. For example, in one embodiment, the optical signal is provided by way of an infrared emitter, such as an infrared light emitting diode and is detected by an infrared detector, such as an optical camera or an infrared photodiode. Use of an infrared signal is beneficial as infrared light is not perceivable by the human eye but is readily detectable using electronic systems configured to do so. For example, infrared receivers and emitters are routinely incorporated into a display device and its remote control.

In various embodiments, the synchronize signal includes information about video to be synchronized, such as a time stamp, which allows the second display device to begin displaying video matching the time stamp in order that the two displays are synchronized. Optionally, synchronize signals are periodically or aperiodically included in the video stream to allow for multiple step synchronization, synchronization verification or re-synchronization of video that becomes out of sync.

Figure 2B:
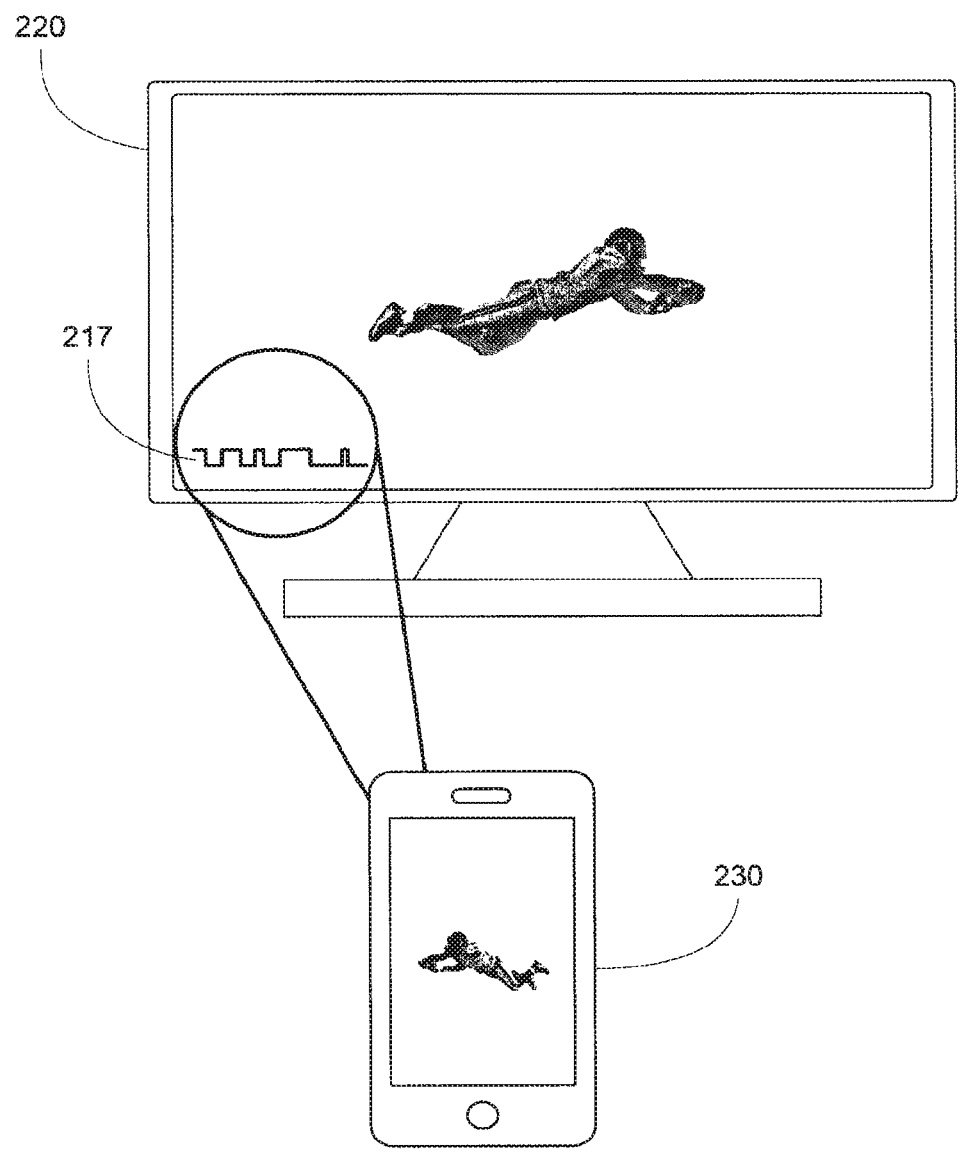
FIG. 2B illustrates an embodiment of observing a synchronization signal and the resultant synchronization of displays of the same event from two different camera angles.

FIG. 2B illustrates a synchronize signal 217 displayed on display device 220 at the moment that the video displayed on display device 230 should begin. The synchronize signal 217 is illustrated in FIG. 2B as a generic digital signal, but, as described above, synchronize signal 217 may be an image or pattern that is detectable by a camera of display device 230 or an associated receiver. In embodiments where synchronize signal 217 is an audio signal, display device 230 or an associated receiver optionally includes an microphone for detection of the synchronize signal 217.

Figure 3:
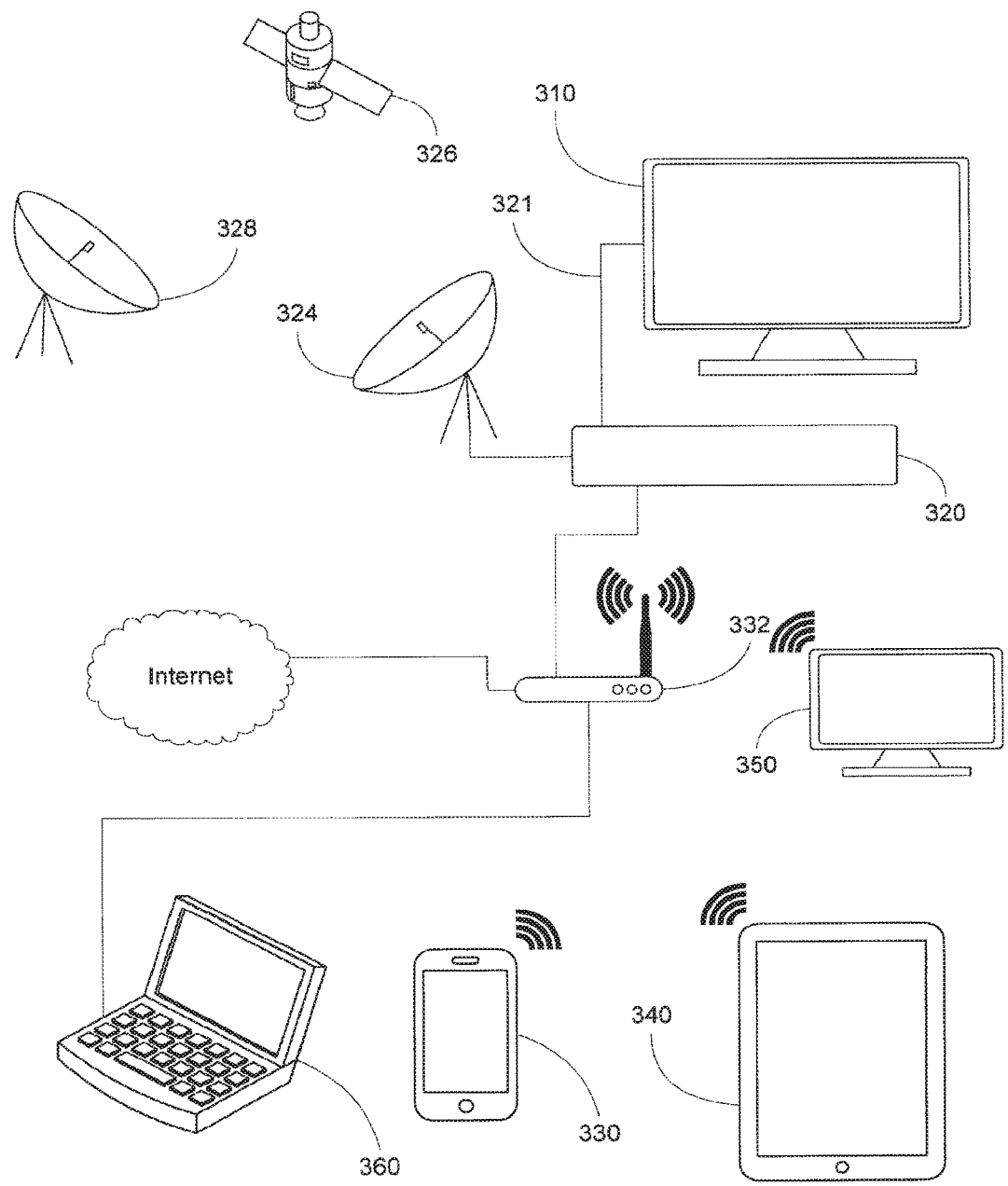
FIG. 3 illustrates a system embodiment with various display devices.

FIG. 3 illustrates a system including multiple display devices. Display device 310 attaches directly to receiver 320, such as using an audio/video cable 321. Video streams are received at receiver 320 from satellite receiver 324, which, in turn, receives signals from satellite 326 and satellite transmitter 328. Receiver 320 is connected to a network by way of wireless access point 332, which provides wireless connectivity to various display devices 330, 340 and 350. Wireless access point connects to the Internet and to laptop 360 using hardwired network connections. Other network configurations are possible, such as any combination of wired and wireless connections and/or where there is no connection to the Internet or where the connection to the Internet is wireless. In various embodiments, video for display at any one or more of display devices 310, 330, 340 and 350 and laptop 360 is provided via receiver 320 and satellite receiver 324. In various embodiments, video for display at any one or more of display devices 310, 330, 340 and 350 and laptop 360 is provided via the Internet and wireless access point 332.

Figure 4:
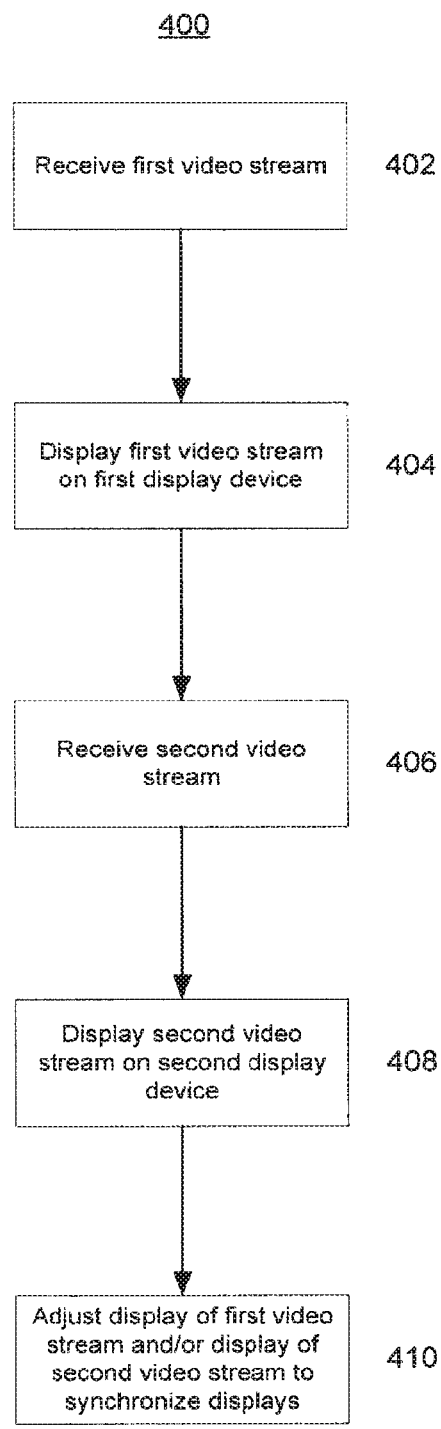
FIG. 4 provides an overview of a method embodiment for displaying synchronized video from multiple camera angles on different displays.

FIG. 4 illustrates a method embodiment 400 for real-time synchronization of video from multiple cameras. Method 400 is optionally performed using any of the systems and devices described herein. Components of such systems and devices may be implemented using hardware, software and/or firmware. Further, the performance of method 400 optionally includes one or more instances of the component of computer system 700 of FIG. 7.

As illustrated in FIG. 4, the first video stream is received, at 402. Next, at 404, the first video stream is displayed on a first display device. At 406, a second video stream is received. At 408, the second video stream is displayed on a second display device. Other embodiments are contemplated in which the first video stream and the second video stream are received and/or displayed simultaneously. Finally, at 410, the display of the first video stream and/or the display of the second video stream are adjusted to synchronize the displays.

As used herein, the phrase "real-time" refers to a timing of events such that one event occurs within a short time period of another event, such as a time period of 10 seconds or less or 5 seconds or less or 1 second or less or 0.5 seconds or less. Real-time, as used herein, contrasts with processes that take significant time and effort to perform by a single person, such as a time period of minutes to hours or more.

As used herein, the terms synchronous, sync, synchronized, synchronization and the like refer to a matching of two or more activities such that they occur at the same time or with a nearly imperceptible time difference between them, such as a time difference of less than 0.1 seconds, less than 0.05 seconds or less than 0.01 seconds. In embodiments, two video streams are synchronized when the events that they depict are matched in time such that the same event appears on two displays at the same time or with a nearly imperceptible time difference between them, such as a time difference of 0.1 seconds, less than 0.05 seconds or less than 0.01 seconds. For example, in one embodiment, two video streams are synchronized when an event that is captured in one video stream is displayed at the same time, or within a nearly imperceptible time, as a display of the same event that is captured in a second video stream. Displays of video are considered to be synchronized, in embodiments, when events that are depicted in the displays that occurred at the same time are displayed at the same time. As will be understood by the present disclosure, even though different video can appear on each display, such as videos captured from different cameras and from different vantage points, the display of the videos can synchronized.

Figure 5:
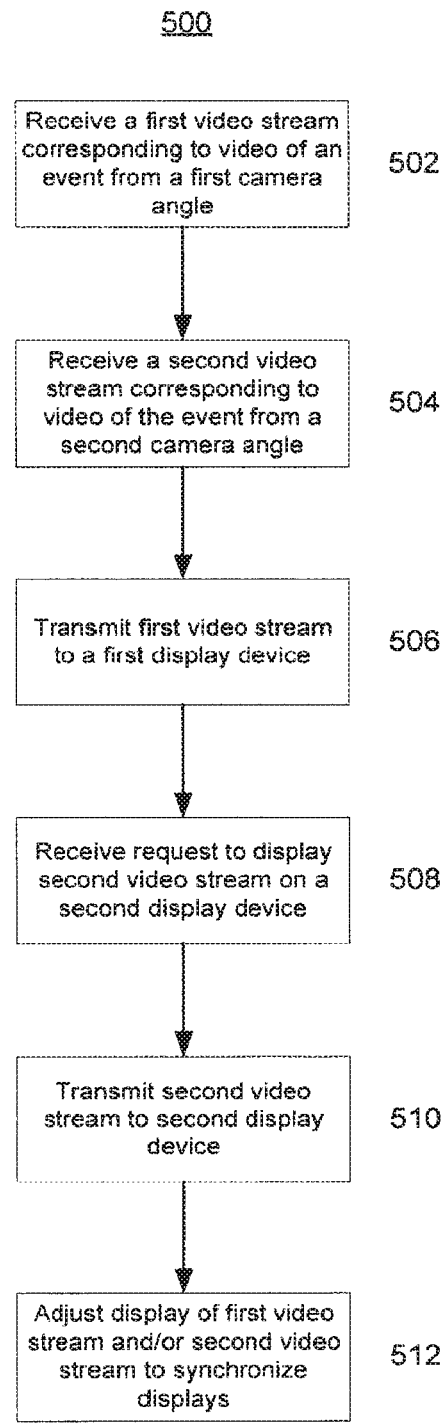
FIG. 5 provides an overview of a method embodiment for displaying synchronized video from multiple camera angles on different displays FIG. 6A, FIG. 6B, FIG. 6C and FIG. 6D provide an overview method embodiments for adjusting displays of video streams in real-time to synchronize the displays.

FIG. 5 illustrates a method embodiment 500 for real-time synchronization of video of an event from multiple cameras. Method 500 is optionally performed using any of the systems and devices described herein. Components of such systems and devices may be implemented using hardware, software and/or firmware. Further, the performance of method 500 optionally includes one or more instances of the component of computer system 700 of FIG. 7.

In FIG. 5, at 502, a first video stream corresponding to video of the event from a first camera angle is received. At 504, a second video stream corresponding to video of the event from a second camera angle is received. The first video stream is the transmitted to the first display device, at 506, so that the first display device can display the first video stream. For example, transmissions of this nature can occur over an audio/video cable, such as an HDMI cable, or over a network, or via radio, or via data output connection (USB, Firewire), etc. In some embodiments, such a transmission can occur as a digital signal sent between one component of a display device and another component of a display device. Next, at 508, a request to display the second video stream on a second display device is received. The second video stream is transmitted, at 510, to the second display device so that the second display device can display the second video stream. At 512, the displays of at least one of the first video stream and the second video stream are adjusted in real-time to synchronize the displays of the first video stream and the second video stream. As described above, various methods are useful for adjusting the displays in order to synchronize the displays of the video streams.

FIGS. 6A-6D provide overviews of various techniques 600A-D for adjusting displays of one or more video streams to synchronize displays of the video streams. Methods 600A-D are optionally performed using any of the systems and devices described herein. Components of such systems and devices may be implemented using hardware, software and/or firmware. Further, the performance of methods 600A-D optionally includes one or more instances of the component of computer system 700 of FIG. 7.

Figure 6A:
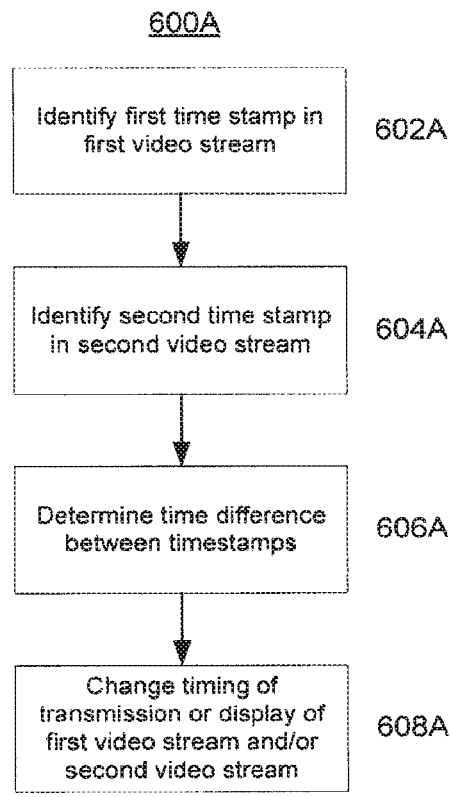

In FIG. 6A, the displays of the first and/or second video streams are adjusted by first identifying, at 602A, a first time stamp in the first video stream. At 604A, a second time stamp is identified in the second video stream. At 606A, the time difference between the time stamps is determined and, at 608A, the timing of transmission or display of the first video stream and/or the second video stream is changed.

Figure 6B:
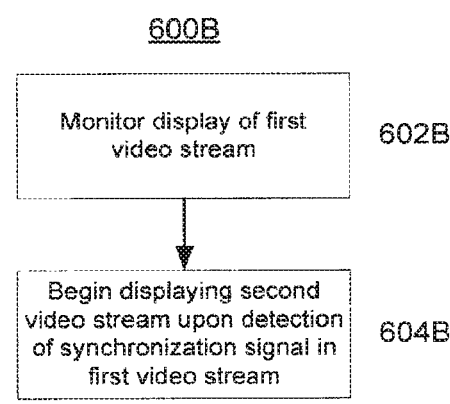
Figure 6C:
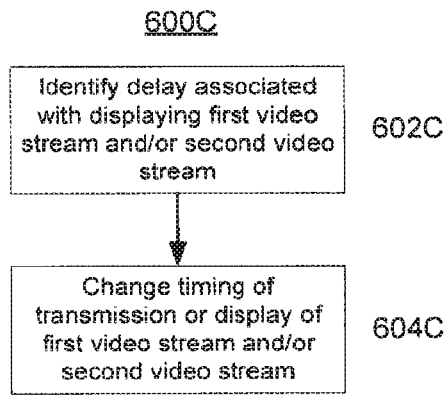
Figure 6D:
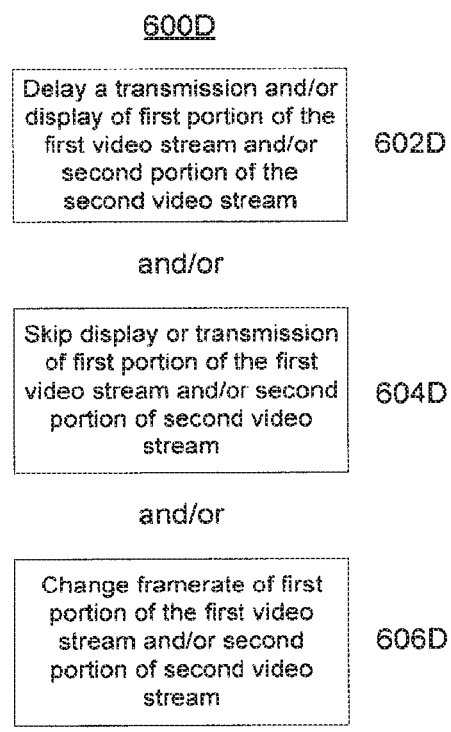

In FIG. 6B, the displays of the first and/or second video streams are adjusted by first monitoring the display of the first video stream, at 602B. Then, at 604B, the display of the second video stream is started upon detection of a synchronization signal in the first video stream. In FIG. 6C, the displays of the first and/or second video streams are adjusted by first identifying a delay associated with displaying the first video stream and/or the second video stream, at 602C. At 604C, the timing of the transmission or display of the first video stream and/or the second video stream is changed to synchronize the displays and accommodate the delay associated with the displays. In FIG. 6D, one or more steps occurs to adjust the displays of the first and/or second video streams. At 602D, the transmission or display of a first portion of the first video stream and/or a second portion of the second video stream is delayed. At 604D, the display or transmission of a first portion of the first video stream and/or a second portion of a second video stream are skipped. At 606D, the framerate of a first potion of the first video stream is changed and/or a framerate of a second portion of the second video stream is changed. In these ways, the displays of the first video stream and the second video stream can be synchronized.

Figure 7:
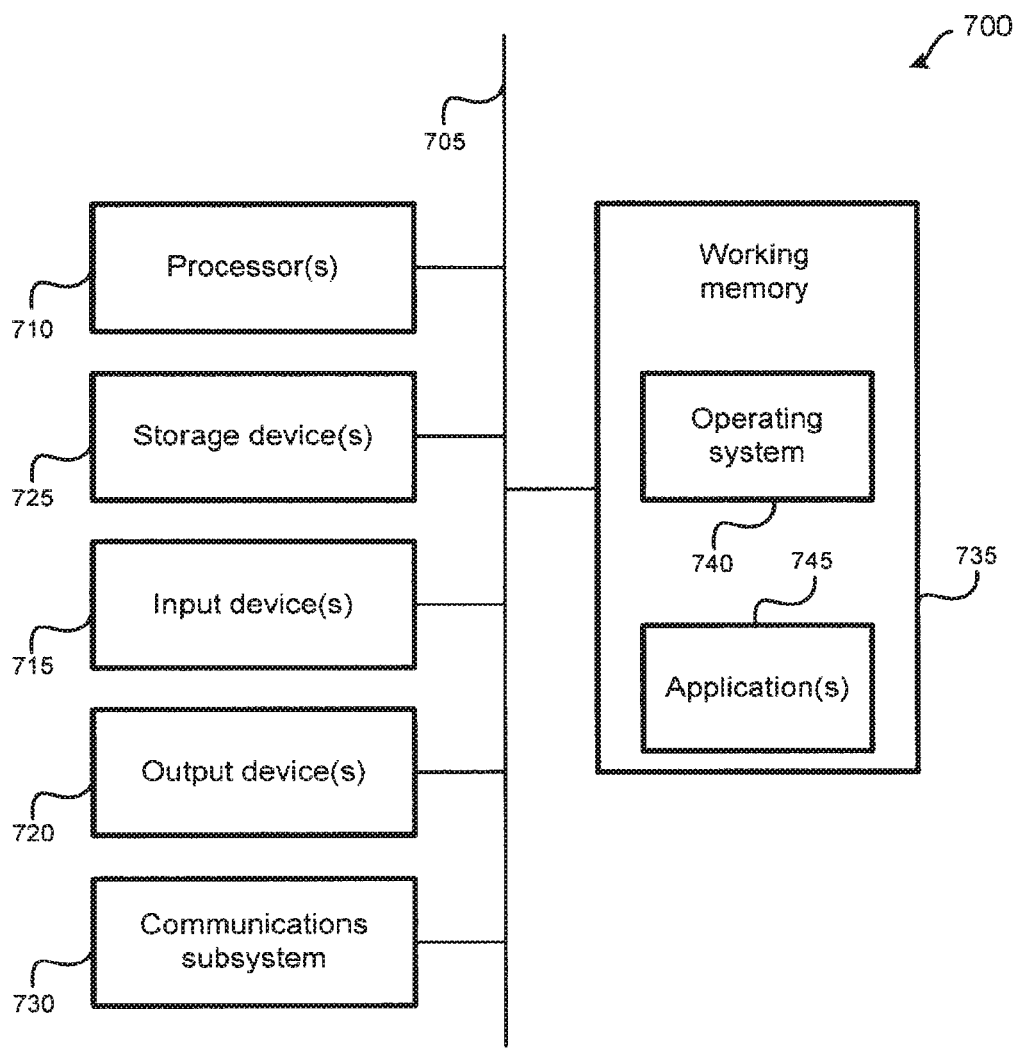
FIG. 7 illustrates an embodiment of a computer system.

A computer system as illustrated in FIG. 7 may be incorporated as part of the previously described computerized devices, such as the described television receivers. FIG. 7 provides a schematic illustration of one embodiment of a computer system 700 that can perform various steps of the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, video decoders, and/or the like); one or more input devices 715, which can include without limitation a mouse, a keyboard, remote control, and/or the like; and one or more output devices 720, which can include without limitation a display device, a printer, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

It should further be understood that the components of computer system 700 can be distributed across a network. For example, some processing may be performed in one location using a first processor while other processing may be performed by another processor remote from the first processor. Other components of computer system 700 may be similarly distributed. As such, computer system 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for real-time synchronization of a plurality of different video streams comprising video of a same event, the method comprising:
   receiving a first video stream and a second video stream that is different from the first video stream, both the first video stream and the second video stream corresponding to video of a same event, the first video stream including a synchronization signal;
   first transmitting the first video stream to a first display device for display thereon;
   second transmitting the second video stream to a second display device for display thereon, the second display device being different from the first display device;
   detecting the synchronization signal, during display of the first video stream by the first display device, by using a sensor to monitor the first video stream; and
   adjusting timing of the second video stream in real-time in response to detecting the synchronization signal, such that adjusting the timing causes display of the second video stream by the second display device to be synchronized with display of the first video stream by the first display device.

2. The method of claim 1, wherein the adjusting timing comprises:
   detecting, in accordance with the detecting the synchronization signal, a time difference between the second video stream and the display of the first video stream by the first display device; and
   adjusting displaying or transmitting of the second video stream to accommodate for the detected time difference.

3. The method of claim 2, wherein detecting the time difference comprises:
   detecting a first timestamp in the first video stream corresponding to the synchronization signal; and
   identifying a second timestamp in the second video stream that corresponds to the first time stamp.

4. The method of claim 2, wherein the adjusting timing comprises:
   skipping displaying or transmitting of a portion of the second video stream to accommodate for the detected time difference.

5. The method of claim 2, wherein the adjusting timing comprises:
   changing a frame rate of a portion of the second video stream to accommodate for the detected time difference.

6. The method of claim 1, wherein:
   the second display device is in communication with the sensor; and
   the adjusting timing is performed by the second display device.

7. The method of claim 1, wherein:
   the second transmitting is performed by a television receiver in communication with the sensor; and
   the adjusting timing comprises adjusting timing of the second video stream as second transmitted by the television receiver to the second display device for display thereon.

8. The method of claim 1, wherein:
   the first video stream corresponds to video of the same event captured from a first camera angle; and
   the second video stream corresponds to video of the same event captured from a second camera angle.

9. The method of claim 1, wherein the adjusting timing is performed during display of the second video stream by the second display device.

10. The method of claim 1, wherein the synchronization signal is imperceptible to a human user.

11. The method of claim 1, wherein the synchronization signal is aperiodic.

12. A television receiver comprising:
   one or more processors; and
   a memory communicatively coupled with and readable by the one or more processors and having stored therein processor-readable instructions that, when executed by the one or more processors, cause the one or more processors to perform operations including:
      receiving a first video stream and a second video stream that is different from the first video stream, both the first video stream and the second video stream corresponding to video of a same event, the first video stream including a synchronization signal;

first transmitting the first video stream to a first display device for display thereon;

second transmitting the second video stream to a second display device for display thereon, the second display device being different from the first display device;

detecting the synchronization signal, during display of the first video stream by the first display device, by using a sensor to monitor the first video stream; and adjusting timing of the second video stream in real-time in response to detecting the synchronization signal, such that adjusting the timing causes display of the second video stream by the second display device to be synchronized with display of the first video stream by the first display device.

13. The television receiver of claim 12, further comprising:

a first circuit to receive the first video stream from a first network;

a second circuit to receive the second video stream from a second network;

one or more data output connections to transmit the first video stream and the second video stream.

14. The television receiver of claim 12, wherein the one or more processors perform the adjusting timing by:

detecting, in accordance with the detecting the synchronization signal, a time difference between the second video stream and the display of the first video stream by the first display device; and adjusting displaying or transmitting of the second video stream to accommodate for the detected time difference.

15. The television receiver of claim 14, wherein the one or more processors perform the adjusting timing by:

skipping displaying or transmitting of a portion of the second video stream to accommodate for the detected time difference.

16. The television receiver of claim 14, wherein the one or more processors perform the adjusting timing by:

changing a frame rate of a portion of the second video stream to accommodate for the detected time difference.

17. The television receiver of claim 12, wherein:

the television receiver is in communication with the sensor; and the one or more processors perform the adjusting timing by adjusting timing of the second video stream as second transmitted by the television receiver to the second display device for display thereon.

18. The television receiver of claim 12, wherein:

the first video stream corresponds to video of the same event captured from a first camera angle; and the second video stream corresponds to video of the same event captured from a second camera angle.

19. The television receiver of claim 12, wherein the one or more processors perform the adjusting timing during display of the second video stream by the second display device.

20. A non-transitory processor-readable medium for real-time synchronization of a plurality of different video streams comprising video of a same event, the medium comprising processor-readable instructions configured to cause one or more processors to perform operations including:

receiving a first video stream and a second video stream that is different from the first video stream, both the first video stream and the second video stream corresponding to video of a same event, the first video stream including a synchronization signal;

first transmitting the first video stream to a first display device for display thereon;

second transmitting the second video stream to a second display device for display thereon, the second display device being different from the first display device;

detecting the synchronization signal, during display of the first video stream by the first display device, by using a sensor to monitor the first video stream; and adjusting timing of the second video stream in real-time in response to detecting the synchronization signal, such that adjusting the timing causes display of the second video stream by the second display device to be synchronized with display of the first video stream by the first display device.

* * * * *